(12) United States Patent
Hommel

(10) Patent No.: US 7,716,805 B2
(45) Date of Patent: May 18, 2010

(54) SCREWED CONNECTION

(76) Inventor: Gunter Hommel, Fontanestrasse 8, Bad Zwesten (DE) 34596

( * ) Notice: Subject to any disclaimer, the term of this patent is extended or adjusted under 35 U.S.C. 154(b) by 0 days.

(21) Appl. No.: 11/363,764

(22) Filed: Feb. 28, 2006

(65) Prior Publication Data

US 2006/0210376 A1 Sep. 21, 2006

Related U.S. Application Data

(62) Division of application No. 10/518,676, filed as application No. PCT/DE03/02022 on Jun. 17, 2003, now abandoned.

(30) Foreign Application Priority Data

Jun. 18, 2002 (DE) .......................... 202 09 456 U
Apr. 2, 2003 (DE) .............................. 103 14 948

(51) Int. Cl.
*B23P 11/00* (2006.01)
*F16B 35/06* (2006.01)
(52) U.S. Cl. .................... 29/525.02; 411/399
(58) Field of Classification Search ................. 29/525, 29/525.01, 525.02, 525.05, 428, 505, 407.01; 411/399, 369, 371.1; 407/103
See application file for complete search history.

(56) References Cited

U.S. PATENT DOCUMENTS

| | | | |
|---|---|---|---|
| 1,132,732 A | 3/1915 | Robinson | |
| 2,030,088 A * | 2/1936 | Young | 411/371.2 |
| 2,086,086 A * | 7/1937 | Lassonde | 411/371.1 |
| 3,202,033 A | 8/1965 | Weidner | |
| 3,298,270 A | 1/1967 | Launay | |
| 3,849,964 A | 11/1974 | Briles | |
| 4,663,910 A * | 5/1987 | Hasan | 52/410 |
| 5,256,019 A * | 10/1993 | Phillips, II | 411/187 |
| 5,878,488 A * | 3/1999 | Muirhead | 29/890.035 |
| 6,155,754 A * | 12/2000 | Jonsson | 407/103 |
| 6,179,538 B1 | 1/2001 | Palm | |
| 6,361,259 B1 * | 3/2002 | Koeppel et al. | 411/399 |
| 6,926,484 B2 * | 8/2005 | Kram et al. | 411/311 |

FOREIGN PATENT DOCUMENTS

| DE | 1 901 261 | 9/1964 |
|---|---|---|
| GB | 997 733 | 7/1965 |

\* cited by examiner

*Primary Examiner*—John C Hong
(74) *Attorney, Agent, or Firm*—Ostrolenk Faber LLP

(57) ABSTRACT

The invention relates to a screwed connection, particularly designed for screwing together housing parts. A tight-fitting neck (2) is provided with a tangent continuous transition (37) between the cone (2) and the bolt head (3), in order to ensure the tightness of the screwed connection and the tightening torque in the instance of temperature fluctuations and different materials with different coefficients of expansion. This is achieved due to the special design of the tight-fitting neck.

Figure 1:
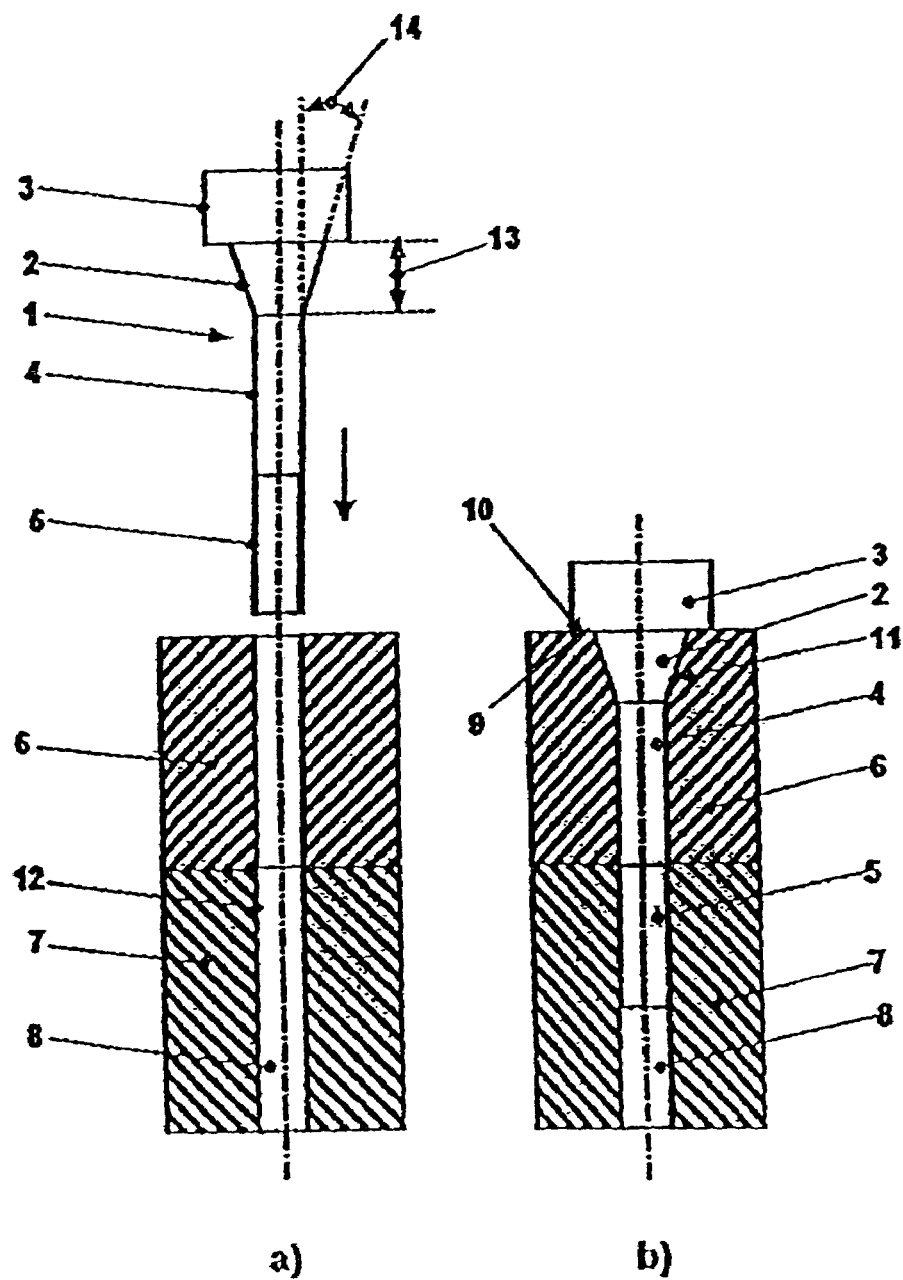

9 Claims, 7 Drawing Sheets a)          b)

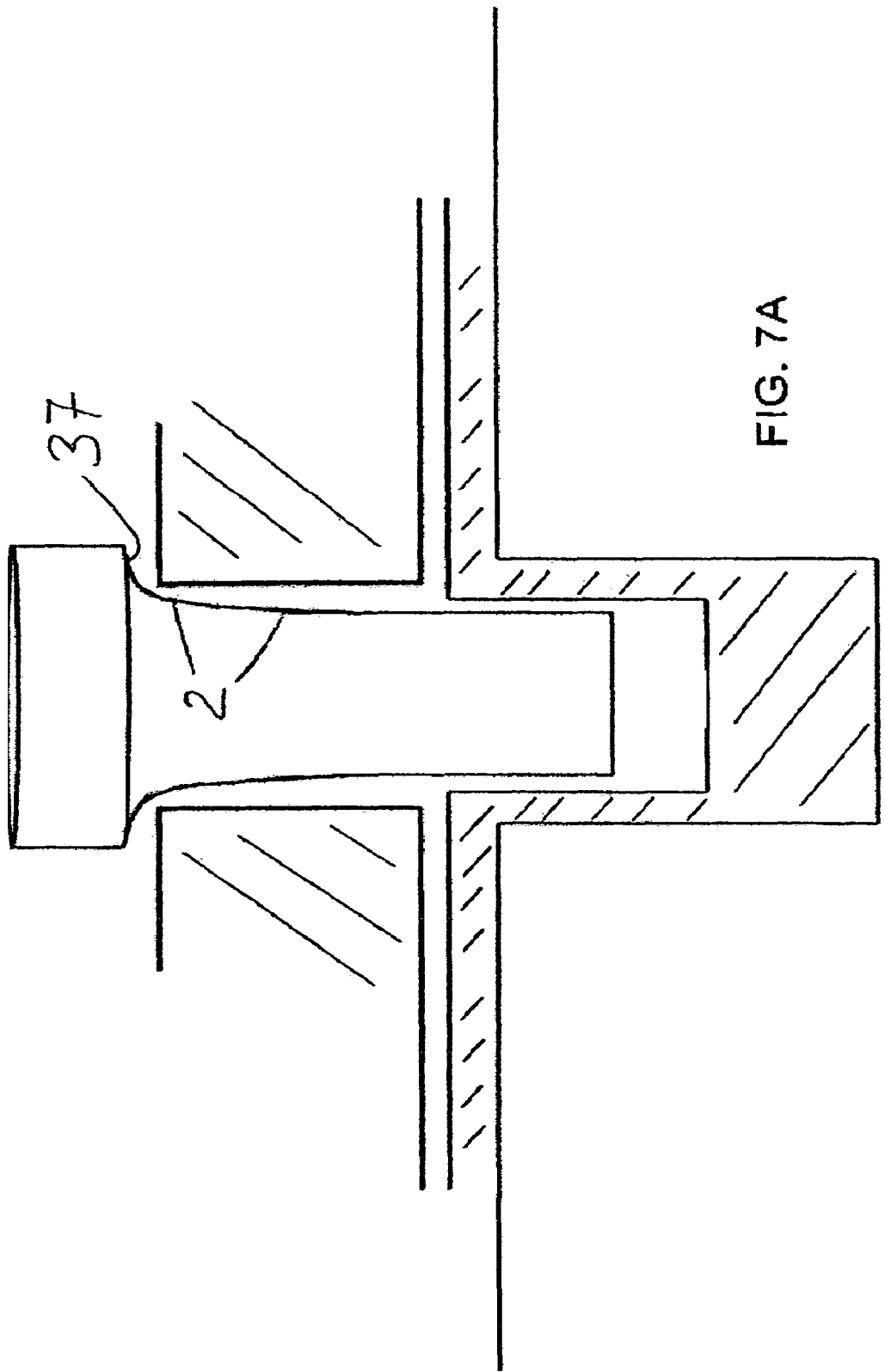

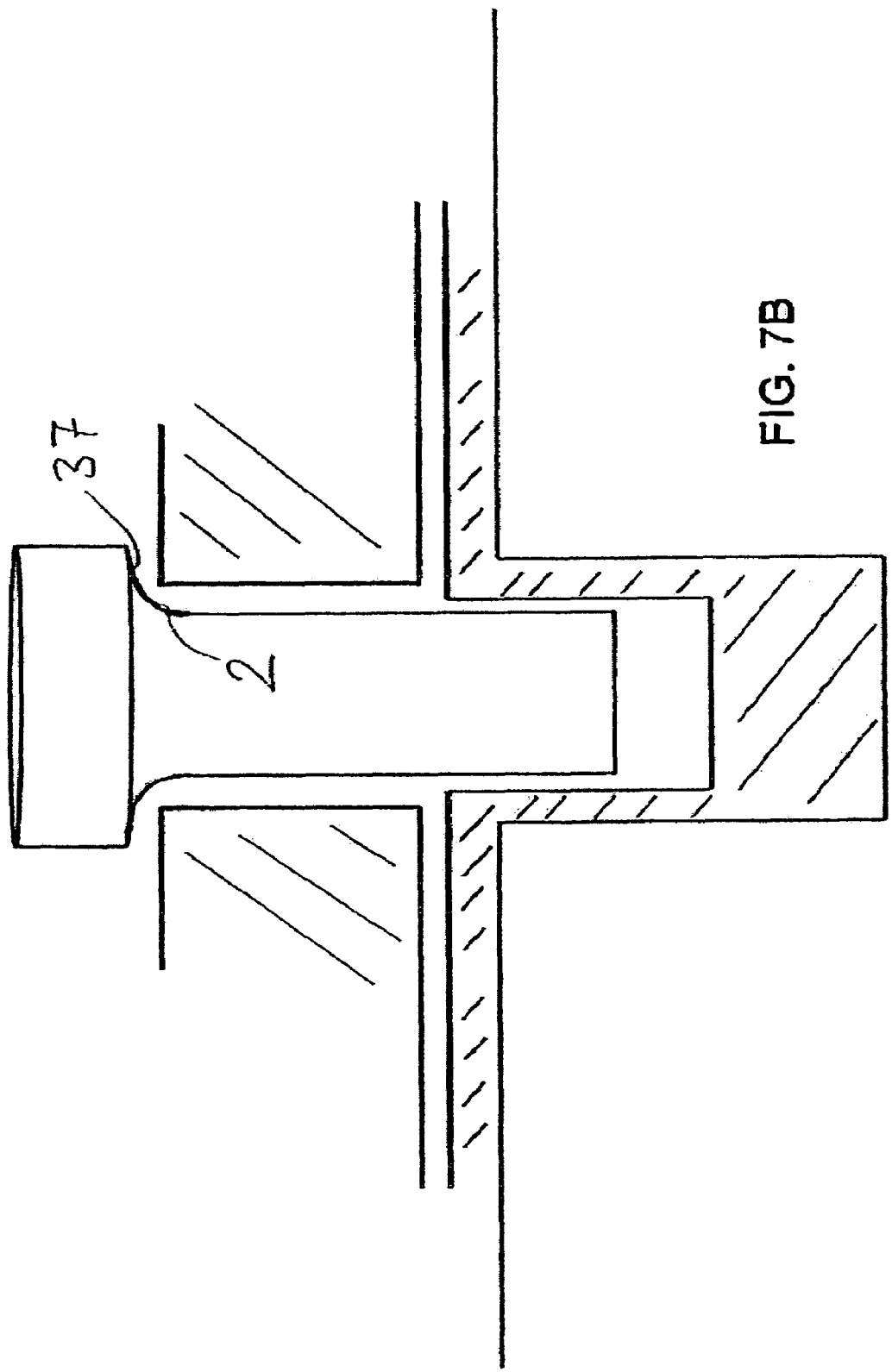

SCREWED CONNECTION

CROSS REFERENCE TO RELATED APPLICATIONS

The present application is a divisional of U.S. patent application Ser. No. 10/518,676, filed Dec. 17, 2004 now abandoned, which is a 35 U.S.C. §371 national phase conversion of PCT/DE03/02022 filed Jun. 17, 2003, which claims priority of German Patent Application No. 202 09 456.1, filed Jun. 18, 2002 and German Patent Application No. 103 14 948.1, filed Apr. 2, 2003.

STATE OF THE ART

The invention relates to a screwed connection, particularly for screwing together housing parts with a series of fixing screws composed of a bolt head, a screw shank and a screw thread, wherein the fixing screws project with their screw shank through a matching bore of a housing top and are screwed with the screw thread into an internal thread of the bottom part of the housing that matches the screw thread, so that the fixing screws are shore up at the housing top and connect the top with the bottom part of the housing in a way that the connection can be released.

Often leakage occurs at screwed connections of housing parts due to manufacturing tolerances, material ruptures and uneven surfaces. This holds true for example for flange connections of gear- or crank shaft housings for vehicles, where special demands are made to the tightness of such connections, as these connections must stand high oil pressures to avoid damage caused by leaking oil. Here it is vital to prevent oil which penetrates through the leakage into the screw bore via the bolt heads of the fixing screws from pressing outwards.

It is common practise, particularly with rotationally symmetric flange connections, to use multi screwed connections, i.e. a series of fixing screws, to achieve a balanced distribution of the necessary assembly pre-load to the tight-fitting flange surfaces. Often standard sealing rings cannot be used due to the available space or due to a necessary minimum tightening torque, which would lead to unacceptable deformations of the housing parts, or they do not lead to the desired tightness.

Another practise consists in the coating of connecting surfaces and tight-fitting necks of fixing screws as sealing method. Due to the fact that a great many of currently used housing materials have mostly differing tightening torques and that the demands to the tightness of the housings are different, the behaviour of such coatings cannot always be predicted, these coatings are only of restricted use and incur additional effort.

Therefore the task of the present invention is to create a screwed connection with simple means, particularly for multi-screwed connections of housing parts that guarantees a reliant and economical tightening function with many uses.

ADVANTAGES OF THE INVENTION

This task is solved according to the invention in connection with the generic term of claim no. 1 in so far as the fixing screws comprise a tight-fitting neck in an area between the screw shank and the bolt head, that, when the fixing screw is screwed in, an external area of the screw bore which is near the tight fitting neck is malleably deformed, so as to create a counter sealing surface in this area, which produces a sealing connection together with the tight-fitting neck.

Because the fixing screws comprise a tight-fitting neck, which creates a counter sealing surface at the housing top by malleable deformation, production tolerances in the screw bores of the housing top can be easily compensated. When the screw is screwed in, a stable and economical sealing connection is quasi automatically created. A series of fixing screws with tight-fitting necks in connection with the housing parts arranged in a circle produces a reliant pressure tight multi-screwed connection of a gear housing for vehicles.

According to a preferred execution of the invention a circumferential clearance in an area next to the respective screw bore is designed as cavity so as to accept material build-ups from the area of the counter sealing surface. This clearance can be formed as a trimming or as a skimming.

The fact that the clearance created from screwing can accept material build-ups avoids material pressed aside to settle at unexpected or undesired spots in the area of the bolt head and/or the housing top and thus affect the tightness of the screwed connection. This further improves the reliance of the sealing connection.

As per a further preferred execution of the invention, the bolt head of the respective fixing screw comprises a bolt head connecting surface on the side facing the tight-fitting neck, which, when the respective fixing screw is screwed in, tightly fits with the connecting surface of the housing top surrounding the respective matching screw bore in an area next to the bolt head connecting surface.

The connecting surfaces increase the support of the fixing screw at the housing top and thus the stability of the connection. The tight-fitting neck is advantageously suited, so that the connecting surface of the bolt head fits closely on the respective counter surface of the housing when the tightening torque is adequately chosen. This can further increase the tightness and stability of the connection and the reliability during the installation. The stability and tightness demands to a multi screwed connection for a gear housing that has to stand an oil pressure of typically several 105 Pa can so be better and particularly advantageously be fulfilled.

According to a further preferred execution of the invention a circumferential tangent continuous transition is formed between the tight-fitting neck and the bolt head connecting surface of the respective fixing screw.

The tangent continuous transition allows the sealing connection to better compensate possibly occurring uneven surfaces and out-of-roundness at the circumference of the screw bores.

Following a further preferred execution of the invention, the height and/or the incline of the tight-fitting neck in relation to the screw shank is adaptable to the dimensions of the screw bore.

This allows the screwed connection to be used at a multitude of differently sized housings. This makes it very flexible, also for applications with different screw sizes within a multi screwed connection or in complex connections of several housing sections among another.

According to a further preferred execution of the invention, the height and/or the incline of the tight-fitting neck in relation to the screw shank is adaptable to the material characteristics of the screw bore.

The design possibilities of the tight-fitting neck as to its height (typically between 1 mm to 5 mm) and as to its incline (typically in a wide angle area between 10° and 80° in relation to the screw shank resp. the screw axis) allow the fixing screws to be perfectly adapted to the material characteristics, particularly to the material hardness and the connected degree of malleable deformation of the area around the screw bore at a defined tightening torque. Furthermore, they allow to take into consideration various bigger production tolerances as they occur at housing parts. Taking into account the multitude of common housing materials on the market, this guarantees a high reliability of the sealing connection and its versatility in view of the usability.

In the preferred executions according to the subclaims nos 8 and 9, the tight-fitting neck is formed as a conic frustrum or as a spherical sector or as a hyperboloid section, the base of which faces the bolt head.

Due to the various designs of the tight-fitting neck, the adaptability of the fixing screws to the material characteristics, the dimensions and production tolerances of the housing parts can be further improved and thus their scope of use be further widened. The conic frustrum tight-fitting neck forming a sealing cone can be produced particularly easily and economically.

According to a further preferred execution of the invention, the tight-fitting neck is, at least on its surface, made of hardened steel.

In housing parts, particularly gear housings made of steel, iron or aluminium, a tight-fitting neck with hardened steel surface is particularly advantageous to reliantly form the counter sealing surface in the respective housing part. In principle, the screwed connection can be made of all common housing—resp. screw materials or of combinations of suitable chosen different similar materials.

Further details of the invention are revealed in the following detailed description and the enclosed drawings, which exemplarily illustrate preferred executions of the invention.

The drawings show:

FIG. 1: a section of a screwed connection with a fixing screw in a side view section; the left side of the illustration a) shows the fixing screw before being screwed in, and the right side of the illustration b) shows the fixing screw when screwed in.

Figure 2A:
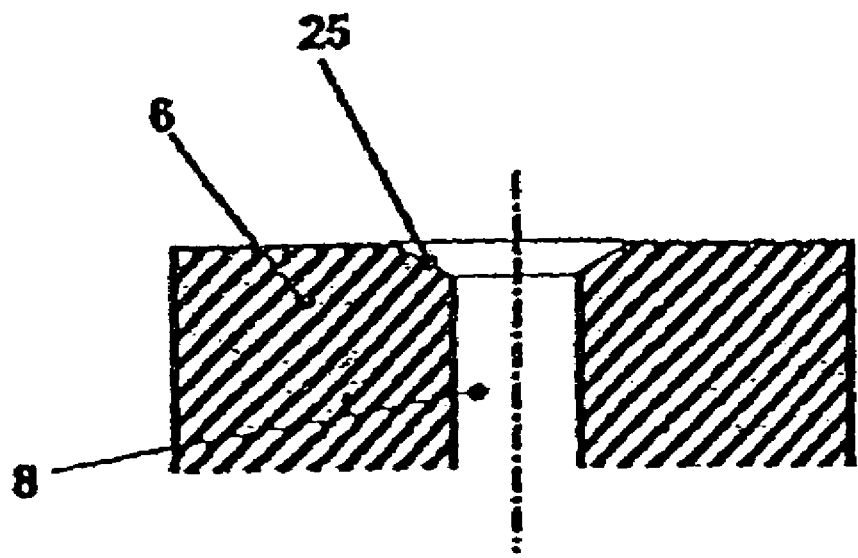
Figure 2B:
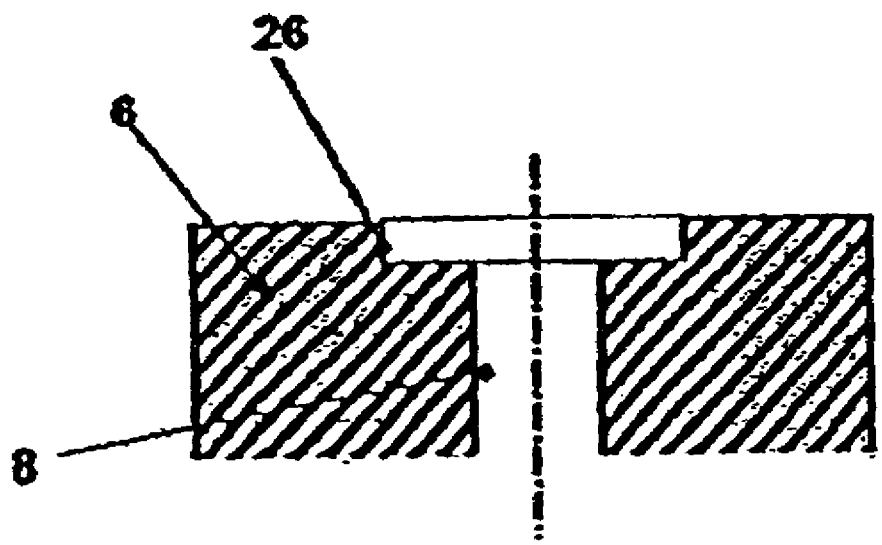
Figure 3:
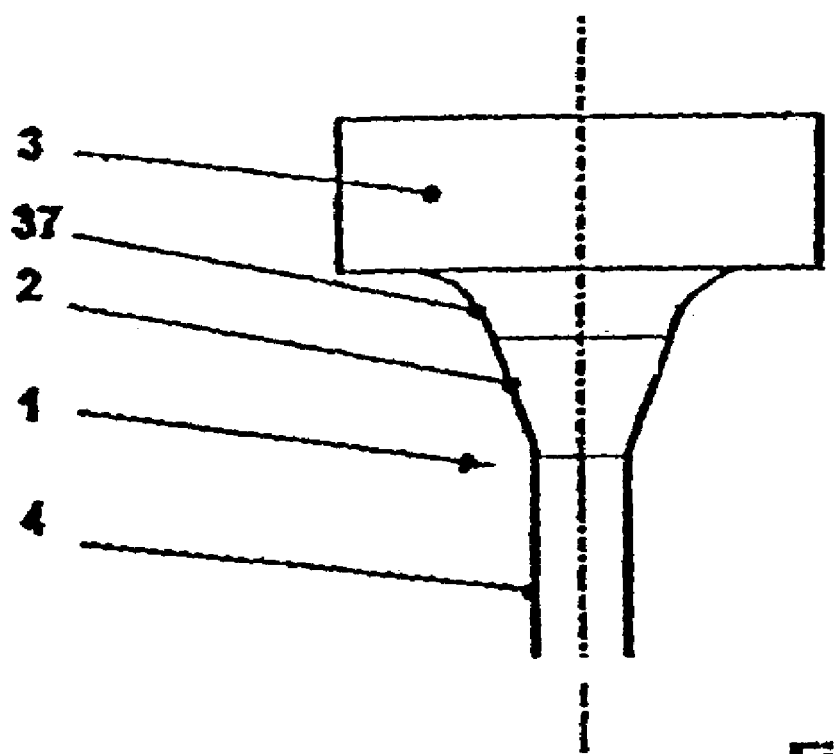

FIG. 2: an enlarged illustration of an upper part of a housing sector.
  a) with a trimming as clearance
  b) with a skimming as clearance FIG. 3: an enlarged illustration of the fixing screw as section with a tangent continuous transition.

Figure 4:
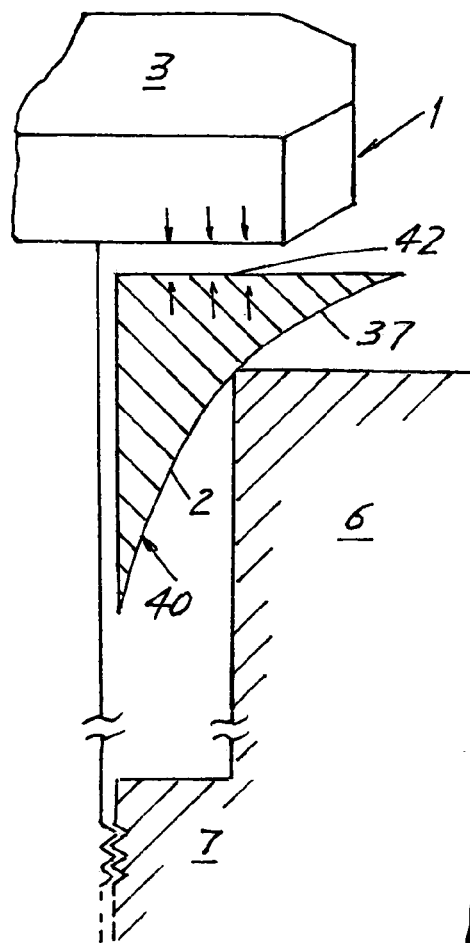

FIG. 4: a general outline of an inserted sealing cone in accordance to the invention, as it is working together with a screw and an housing bore (without deformation).

Figure 5:
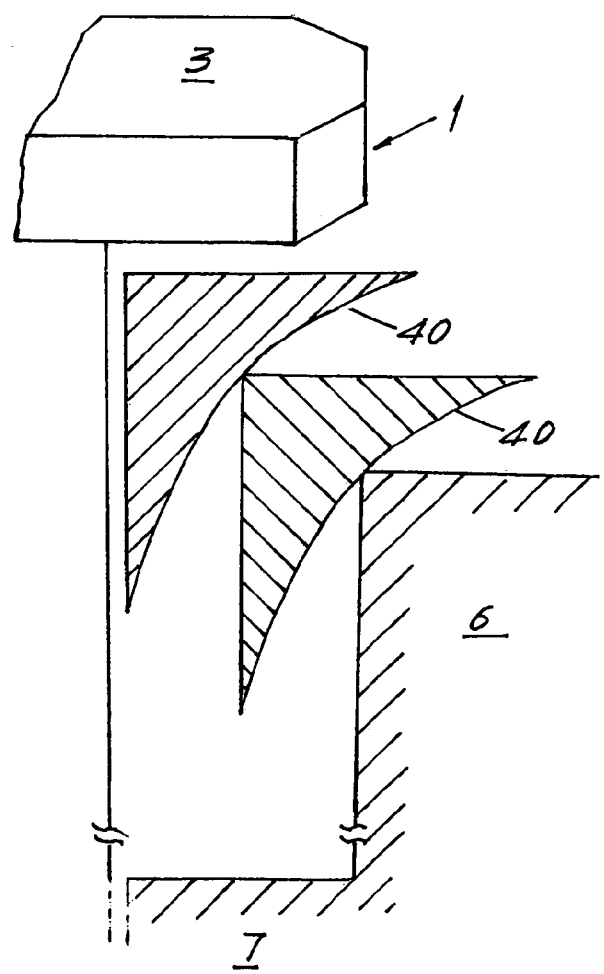

FIG. 5: a general outline of two inserted sealing cones in accordance to the invention, fit into each other, as they are working together with a screw and an housing bore (without deformation).

Figure 6:
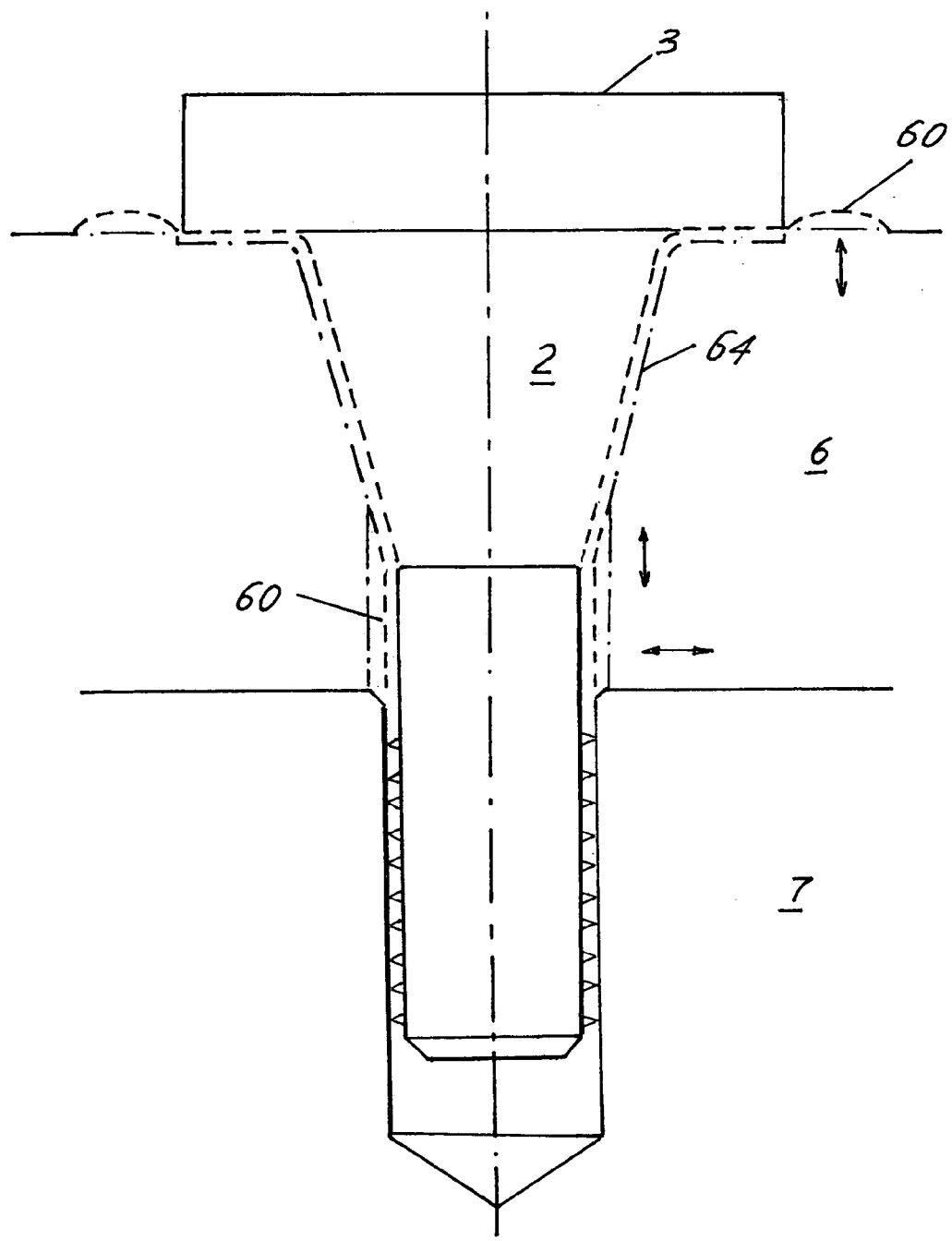

FIG. 6: a general outline and not to scale of a screwed connection with sealing cone in accordance with the invention in cold state (stroked line) resp. in warm state (stroke-dotted contour).

FIG. 7A: a section of a screwed connection with a fixing screw in a side view section; the tight-fitting neck has a hyperboloid section.

FIG. 7B: a section of a screwed connection with a fixing screw in a side view section; the tight-fitting neck has a spherical section.

Basically, a screwed connection consists of a series of fixing screws 1, by which a housing top 6 is screwed together with a bottom part of a housing.

FIG. 1 shows a section of the screwed connection. For simplification, only one fixing screw 1 is shown with the affiliated sections of the housing parts 6 and 7. In fact, the screwed connection consists of a series of fixing screws 1, e.g. of a ring-shaped arrangement to form a flange connection for the gear housing of a vehicle. The invention will be explained on the example of this single fixing screw 1. The description can be transferred to the other fixing screws accordingly.

The fixing screw 1 consists of a bolt head 3 with a bolt head support surface 9, a screw shank 4 and a screw thread 5. Between the screw shank 4 and the bolt head 3 a tight-fitting neck 2 is arranged, advantageously formed as sealing cone. To accept the fixing screw 1, the housing parts 6 and 7 comprise a screw bore 8, whereas the continuation of the bore 8 in the bottom part of the housing 7 comprises a female thread 12.

When the bolt 1 is screwed in (in arrow sense), the tight-fitting neck 2 first touches the external rim of the connection bore 8 of the housing part 6 and is then pressed into an external area of the bore round when the bolt is screwed in further (right side of illustration). Thus a counter sealing surface 11 is formed by a malleable deformation, i.e., a counter cone is formed, which creates a sealing connection together with the tight-fitting neck 2 of screw 1. Thereby the bolt head connecting surface 9 fits closely with an adjoining upper housing connecting surface 10 of the housing part 6. Due to the formation of the sealing connection, service fluids such as e.g. gear or hydraulic oils that are inside the housing and can get into the screw bore 8 of the housing part 6 through leaking flange seals and housing ruptures, cannot get to the outside.

The sealing cone comprises a height 13 and an incline 14 (half the standard opening angle) with reference to the shank 4 resp. the screw axis. The height 13 and incline 14 of the tight-fitting neck 2 can be varied to adjust to the material characteristics of the housing part 6 and particularly to the dimensions and production tolerances of the connection bores 8 of the housing.

For this purpose, four suitable combinations of height 13 and incline 14, as well as the resulting base diameter of the tight-fitting neck 2, are presented in the following table 1 at the example of an invention-adequately modified fixing screw size M8 as per DIN 912:

TABLE 1 design example of the tight-fitting neck 2 for a fixing screw M8.

| Cone height 13 [mm] | Cone incline 14 [°] | Base diameter [mm] |
|---|---|---|
| 1 | 45 | 10.0 |
| 5 | 11 | 10.0 |
| 1 | 51 | 10.5 |
| 5 | 14 | 10.5 |

To accept material build-ups, a clearance can be designed. FIG. 2a shows an enlarged illustration of the clearance as a phase resp. a trimming 25 at the housing part 6. FIG. 2b shows the clearance in the shape of a sink resp. a skimming 26 at the housing part 6.

In a further preferred execution FIG. 3 shows an enlarged section of the fixing screw 1 with a tangent continuous transition 37 between the tight-fitting neck 2 and the bolt head 3 to achieve an improved compensation of uneven surfaces and out-of-roundness at the housing part 6, especially in the area of the screw bore 8.

Furthermore following supplements are made:

1. The tightness and the tightening torque in case of temperature fluctuations and different materials with different coefficients of expansion is guaranteed due to the particular design of the tight-fitting neck according to the present invention.

The functioning of the screwed connection is shown in addition to the FIGS. 1 to 3 at the example of an aluminium housing and a steel sealing cone.

When the screws with an internal sealing cone as per FIG. 3 as tight-fitting neck are screwed into the connection bore 8 in FIG. 1, the conical part presses into the upper rim section of the bore. The rim section of the bore deforms in accordance with the pressing cone and creates a sealing surface. According to the invention the upper rim section of the bore cannot collapse into the cavity of the bore 8 in the housing part 6, as would be the case with a conventional screw with a short projection. Instead the upper rim section of the bore deforms and is pressed to the free end of the bore.

When the above mentioned tangent continuous transition 37 with reference to FIG. 3 is additionally used between the projection and the cone section—also called "tangential rim section"—the sealing characteristics are further improved, as the mechanism is similar. The sealing surface is still enlarged, as the deformed material even better fits to the tangential section, as the material cannot escape into other directions. The border is even better adjusted from the geometrical point of view.

To a particular degree, the sealing according to the invention is still tight after a multitude of warm/cold-cycles:

When the screwed connection according to the invention is screwed in up to a defined maximum tightening torque in cold state, it is also tight in cold state.

When the materials warm up and expand due to the temperature increase, the material of the housing "flows" into the existing cavities of the housing—in FIGS. 1 and 2 up and down, resp. flows back to the old shape when the temperature falls. The sealing surface does not change its geometry and shape, as the sealing surface in the tight-fitting neck 2 and the tangent area cannot further expand. Consequently, the screwed connection remains tight, even with higher temperature, for example, the working temperature of a motor or a gear etc., and at a defined tightening torque.

When the material draws back into the cold state, the deformation draws back into its original position. Here the sealing surface itself does not deform, but only the above mentioned areas on the outside of the sealing surface do. This allows the tightness and the defined tightening torque to be maintained as well in the cooled down state. In summary the tightening torque of the screw and the tightness do not change after a multitude of cold/warm cycles. The tightness and the originally defined tightening torque of the screw are maintained.

This is illustrated in FIG. 6. The sealing cone or the sealing cone component is shaped in a way that its sealing contour in combination with the cavities 60 of a housing part 6 is formed so that with temperature fluctuations and different materials of sealing cone and; housing 6, 7 with different temperature expansion coefficients the housing expands or shrinks into and out of the cavities 60 and the cone surface 64 of the screw and the housing remains basically unchanged, which guarantees a continuous tightening torque and tightness.

FIGS. 7A and 7B illustrate, respectively, alternate embodiments of the invention. In FIG. 7A, the tangent continuous transition 37 portion of the fixing screw is provided with a hyperboloid section. Alternately, in FIG. 7B, the tangent continuous transition 37 portion of the fixing screw has a spherical section.

2. Re-Installation and Dismantling in Case of Repair:

The tightening torque and the tightness in case of dismantling and re-installation are guaranteed with the same tight-fitting neck. The functioning is analogue as described above, with the single difference that in the case of re-use the same tight-fitting neck or a new sealing cone can be inserted into the pre-formed bore.

3. Possible Designs and Variations

The so-called tight-fitting neck 2 with or without tangent continuous transition 37 needs not necessarily be an integrated compound of the screw, as shown in FIGS. 1 to 3, i.e. it needs not necessarily be designed as being one piece with the screw as tight-fitting neck 2. Instead, it can also be, as is shown exemplarily in FIG. 4, a separate component 40—here called sealing cone—with an internal hole or internal bore and can be combined with a standard screw of a matching cross section that passes through to achieve the inventive effect. It has a shape the sealing surface of which in principle matches the cross section of the bore—or generally speaking of the hole—in the housing part 6. In the case of a bore this shape is a rotationally symmetrical shape with a sealing contour, as described above for the tight-fitting neck. Furthermore, it has a sealing surface 42 designed for the tightening fit of the bolt head normal to the axis of the internal hole.

Should the connecting hole, which is a component of the exemplary screwed connection in the above-described execution examples and which connects the top and bottom parts of the housing, have a non-round cross section, it goes without saying that the "sealing cone" can have at its external surface a matching non-round shape, i.e. from the geometrical point of view it is no longer a cone, and the so-called sealing cone can then itself have an internal bore which comprises a further internal cone that can work as a sealing surface when it is combined with a screw with tight-fitting neck according to the invention or with a standard screw with a separate internal sealing cone. This provides the advantage that non-round connecting holes as well can be sealed, such as may be forced by the application in an individual case.

The sealing principle of the present invention can thus be repeated "interlocking", as is exemplarily illustrated in FIG. 5.

In the preferred execution, the sealing cone is harder as compared to the housing material, so that the rim section of the bore in the housing gets deformed more easily, ref. FIG. 1*a*) and FIG. 1*b*).

4. Applications:

The present invention can be used in the most different technical areas. It is particularly suitable when high demands to the screwed connection are made as to tightness and stability at different temperatures and materials.

The invention claimed is:

1. A method for sealingly connecting at least a first component and a second component of a housing, wherein said housing is selected from the group consisting of gear housings and crankshaft housings, using a plurality of thread screws formed from a material having a hardness greater than that of said housing components, each said screw comprising a bolt head and a screw shank connected to the bolt head and having a screw thread on a first shank portion, the first and second housing components having screw bores formed therein to permit passage of the thread screws therethrough, the method comprising the steps of:

providing each of the thread screws with a cone frustum or cone shape having a linear or curved conical outline in a neck area between the screw shank and the bolt head, with at least a substantial length of the cone frustum or cone shape having a diameter greater than a diameter of the screw bore into which the thread screw is configured for insertion therethrough;

projecting each thread screw with its screw shank through a screw bore of a first housing component without a washer and screwing the shank with threads into a matching female thread of a second housing component, so that the thread screws shore up at the first component of the housing and connect the first component with the second component of the housing;

tightening the threads into the female thread of the second housing component to wedgingly force the cone frustum or cone shape in the neck area of the thread screw into the screw bore, with the wedging force being sufficient to radially expand the diameter of the screw bore adjacent the cone frustum or cone shape to create a counter sealing surface of walls of the screw bore against the cone frustum or cone shape, with the counter sealing surface being formed in a counter cone configuration relative to the cone frustum or cone shape, the neck area having been configured to preclude material at an upper rim section of the screw bore from collapsing into a cavity of the screw bore upon the tightening.

2. The method according to claim 1, wherein the screw comprises a tangent-continuous transition as a third shank portion located in a transition area between the second shank portion and the bolt head.

3. A method for sealingly connecting at least a first component and a second component of a housing, wherein said housing is selected from the group consisting of gear housings and crankshaft housings, said connection being produced by a plurality of thread screws formed from a material having a hardness greater than that of said housing components, the method comprising the steps of:

inserting at least one said thread screw into a screw bore in said housing components; and interposing at least one sealing cone component between the thread screw and the screw bore, each said thread screw comprising a bolt head and a screw shank connected to the bolt head and having a screw thread on a first shank portion, and each said cone component defining an internal hole configured and adapted to permit passage therethrough of a screw shank, of round or non-round cross-section, the cone component having an outer tight-fitting neck and a sealing surface adapted to permit tight fitting of the bolt head, normal to the axis of the internal hole, the method further comprising the steps of:

adjusting at least one of the height and an incline of the tight-fitting neck in relation to the screw shank and to material properties of a screw bore brim, such that, when a thread screw is screwed in, an external area of the bore brim of the screw next to the tight-fitting neck is deformed, so that a counter sealing surface is created which makes a sealing connection in combination with the tight-fitting neck; and screwing the thread screw into the screw bore to force the cone component to deform the external area of the bore brim and to make the sealing connection between the bolt head and the tight fitting neck.

4. The method of claim 3, wherein the tight-fitting neck is shaped as a cone frustum.

5. The method of claim 3, wherein the tight-fitting neck is shaped as a spherical section or as a hyperboloid section, a base portion of which faces the bolt head.

6. A method for sealingly connecting at least a first component and a second component of a housing, wherein said housing is selected from the group consisting of gear housings and crankshaft housings, using a plurality of thread screws formed from a material having a hardness greater than that of said housing components, each said screw comprising a bolt head and a screw shank connected to the bolt head and having a screw thread on a first shank portion, the first and second housing components having screw bores formed therein to permit passage of the thread screws therethrough, the method comprising the steps of:

providing each of the thread screws with a cone frustum or cone shape having a linear portion in a conical outline in a neck area between the screw shank and the bolt head, with at least a substantial length of the cone frustum or cone shape having a diameter greater than a diameter of the screw bore into which the thread screw is configured for insertion therethrough;

projecting each thread screw with its screw shank through a screw bore of a first housing component without a washer and screwing the shank with threads into a matching female thread of a second housing component, so that the thread screws shore up at the first component of the housing and connect the first component with the second component of the housing;

the linear cone shape having an outer surface set at an angle relative to the screw shank whereby tightening the threads into the female thread of the second housing component wedgingly forces the cone frustum or cone shape in the neck area of the thread screw into the screw bore, with the wedging force being sufficient to radially expand the diameter of the screw bore adjacent the cone frustum or cone shape to create a counter sealing surface of walls of the screw bore against the cone frustum or cone shape.

7. The method of claim 6, wherein the angle is between 11° and 51°.

8. The method of claim 7, wherein the angle is between 14° and 45°.

9. A housing, having at least a first component and a second component of the housing sealingly connected using a plurality of thread screws formed from a material having a hardness greater than that of said housing components;

each thread screw comprising a bolt head and a screw shank connected to the bolt head and having a screw thread on a first shank portion;

the first and second housing components having screw bores formed therein to permit passage of the thread screws therethrough;

each of the thread screws further having a cone frustum or cone shape having a linear or curved conical outline in a neck area between the screw shank and the bolt head, with at least a substantial length of the cone frustum or cone shape having a diameter greater than a diameter of the screw bore into which the thread screw is configured for insertion therethrough;

each thread screw having its screw shank projected through a screw bore of a first housing component without a washer, and the screw shank screwed with threads into a matching female thread of a second housing component, so that the thread screws shore up at the first component of the housing and connect the first component with the second component of the housing;

the threads of the thread screws being tightened into the female thread of the second housing component sufficient to wedgingly force the cone frustum or cone shape in the neck area of the thread screw into the screw bore, with the wedging force being sufficient to radially expand the diameter of the screw bore adjacent the cone frustum or cone shape to create a counter sealing surface of walls of the screw bore against the cone frustum or cone shape, with the counter sealing surface being formed in a counter cone configuration relative to the cone frustum or cone shape, the neck area having been configured to preclude material at an upper rim section of the screw bore from collapsing into a cavity of the screw bore upon the tightening.

* * * * *